United States Patent [19]

Schlapfer

[11] Patent Number: 5,102,640

[45] Date of Patent: Apr. 7, 1992

[54] PROCESS FOR REMOVING METAL IONS FROM SOLUTION WITH A DIPICOLYLAMINE CHEMICALLY BOUND TO THE SURFACE OF A SILICATE

[76] Inventor: Carl W. Schlapfer, Department of Inorganic and Analytical Chemistry, Perolles, 1700 Fribourg, Switzerland

[21] Appl. No.: 546,362

[22] Filed: Jun. 29, 1990

[51] Int. Cl.$^5$ .............................................. C01B 33/20
[52] U.S. Cl. ...................................... 423/326; 423/24; 423/34; 423/100; 423/101; 423/139; 423/140
[58] Field of Search .................... 423/DIG. 14, 34, 42, 423/140, 101, 326, 24, 100; 252/181, 184; 210/679, 688

[56] References Cited

U.S. PATENT DOCUMENTS

| | | | |
|---|---|---|---|
| 3,118,831 | 1/1964 | Morris | 210/688 |
| 3,936,399 | 2/1976 | Hirai et al. | 210/688 |
| 4,659,512 | 4/1987 | Macedo et al. | 423/138 |
| 4,666,683 | 5/1987 | Brown et al. | 423/DIG. 14 |

FOREIGN PATENT DOCUMENTS 59-222292 of 1984 Japan .................... 210/688

Primary Examiner—Theodore Morris
Assistant Examiner—Edward Squillante
Attorney, Agent, or Firm—Kyle W. Rost

[57] ABSTRACT

Dipicolylamine (DPA) is chemically bound to the surface of a silicate, forming a solid phase particle without substantially decreasing the affinity constant of the DPA for certain ions. Then, the solid phase particle is contacted with the solution, thereby binding an ion to the particle. Subsequently the ion can be stripped from the ligand by treatment with a complexing agent or acid.

15 Claims, No Drawings

PROCESS FOR REMOVING METAL IONS FROM SOLUTION WITH A DIPICOLYLAMINE CHEMICALLY BOUND TO THE SURFACE OF A SILICATE

TECHNICAL FIELD

The invention generally relates to organic chemistry and organic compounds. More specifically, the invention relates to transition metal or heavy metal containing compounds, especially to ligands containing copper, cobalt, nickel, and zinc. Disclosed is a new use for a known modified silica surface.

BACKGROUND ART

It is known that certain ligands can combine with metal ions, producing a complex that removes the ion from solution. For example, this type of ligand chemistry has been practiced using crown ethers to capture and remove cobalt ions.

In the past, ligands have been bound to silica gel and thus been immobilized. As a matter of academic achievement, silica gel has been modified to bind 2,2 dipicolylamine (DPA). Studies were done to characterize the modified silica and determine the equilibria with H+ and $Cu^{2+}$ in solution. D. Sallin, Modification d'une silice par greffage de las dipicolylamine et etude de ses interactions avec le Cuivre(II), Diss. No. 929, Universite' de Fribourg, (1987). The modified silica also is described in V. Dudler, L.F. Lindoy, D. Sallin and C.W. Schlapfer, J. Austral. Chem. 40 (1987) 1557. However, no specific application for this modified surface was investigated or known.

Generally, it has been thought that a ligand should have a high affinity constant for the metal cation to be removed from solution. There has been no reliable way of predicting what ligands would have a high affinity, except by experimentation. A further problem has been that as pH lowers with increasing capture of cations, the competitive reaction capturing the H+ ion instead of the metal cation shifts in favor of the H+ ion. Thus, it is increasingly inefficient over time to use ligands for removal of metal cations, as pH drops. Further, in order to be useful in an industrial situation, it has been necessary that the ligand not only capture the ion, but that the ion be removeable from the ligand under readily achievable conditions.

It would be desirable to discover ligands capable of capturinq cations of transition and heavy metals. In particular, it would be desirable to discover ligands capable of efficiently capturing cations even when the ligand is bound to a substrate surface. Further, it would be desirable to discover ligands that maintain a competitive ability to capture cations over a broad range of pH, especially in the low pH range.

To achieve the foregoing and other objects and in accordance with the purpose of the present invention, as embodied and broadly described herein, the ligand and modified silica surface and method of use of this invention may comprise the following.

DISCLOSURE OF INVENTION

Against the described background, it is therefore a general object of the invention to provide an improved method for removing an ion from solution by immobilizing DPA on a silicate, after which the DPA continues to have approximately the same affinity constant for the ion as in the unbound state.

A further object is to provide a bound ligand that can remove cations from solution and later can be treated to strip the captured cation, all without loss of the ligand.

Additional objects, advantages and novel features of the invention shall be set forth in part in the description that follows, and in part will become apparent to those skilled in the art upon examination of the following or may be learned by the practice of the invention. The object and the advantages of the invention may be realized and attained by means of the instrumentalities and in combinations particularly pointed out in the appended claims.

According to the invention, in a process for removing an ion from solution, dipicolylamine is chemically bound to the surface of a silicate, forming a solid phase particle. Then, the solid phase particle is contacted with the solution, thereby binding an ion to the particle.

BEST MODE FOR CARRYING OUT THE INVENTION

In an ion removal system of the type employing a ligand chemically bound to a solid phase particle, so as to be immobilized, dipicolylamine (DPA) is employed in a method of removing an ion from solution. The DPA is bound on the surface of a silicate, such as silica gel, or $SiO_2$, according to known techniques. The modified silica surface prevents loss of the DPA into solution from a processing column or bed and provides a carrier permitting removal or treatment of the bound complex in a recovery environment, in which the removed ion is stripped from the ligand complex. Typically the removed ion is a cation, such as a metal.

The silica or other solid phase particle, when bound to the DPA, is desired to have no or minimally decreasing effect on the affinity constant between the unbound DPA and the ion. Thus, the ions removed from solution are captured within the ligand with efficiency similar to that of the unbound ligand. Yet, the binding of the DPA to the solid particle provides a means by which the ligand can be exposed to an ion stripping environment. For example, a bed of the particles will remain stationary despite a flow of solution being treated or a flow of stripping solution. A bed or column also can be separated from the solution for exposure to stripping solution, as in a separate tank. The solid phase particles can be suspended in either type of solution. Such solutions may be aqueous or contain organic solvent. The stripping solution may contain a complexing agent other than DPA; acid solutions, such as those of pH 4.5 or less, also serve to strip the captured ions.

It has been discovered that the immobilized DPA is a useful ligand for ion removal, despite that fact that this ligand does not have a high affinity constant for heavy or transition metals. This utility exists because the immoblized DPA has low pKa values and, thus, could be useful in a moderately weak acid solution. As an example, with nickel at 0.22 ppm at a pH=3, the loading fraction (F) appears to be (where AL is antilog):

$$\frac{F}{1-F} = \frac{AL8 \times 0.22}{58700 \cdot [1 + (AL2.4 \cdot AL - 3) + (AL2.4 \cdot AL6.5 \cdot AL - 6)]} = 0.4705$$

$$F = 0.4705/1.4705 = 0.32$$

In a hypothetical application requiring removal of nickel having a concentration of 50.0 ppm from an aqueous stream passing through treatment columns at 6 gpm, to a resultant concentration of 0.2 ppm, it may be assumed that the attachment of the cation to the ligand will displace H+ ions and reduce the pH of the solution as it passes through the column. During removal of the final 10% of Ni, a low pH estimated to be 2.77 will occur. At this point, performance of the DPA appears to be:

$$\log K_{Ni} = -8.0$$
$$\log K_{H1} = -2.4$$
$$\log K_{H2} = -6.5$$
$$pH = -2.77$$
$$\text{Ni conc, influent} = -50 \text{ ppm}$$
$$\text{Ni conc, effluent} = -0.2 \text{ ppm}$$

$$\frac{F}{1-F} = \frac{AL8.0 \cdot 0.2}{58700 \cdot [1 + (AL2.4 \cdot AL - 2.77) + (AL2.4 \cdot AL6.5 \cdot AL - 5.54)]}$$

$$F = 0.129$$

Integration of the loading of the bound DPA bed (50 equal-log-ratio increments with accuracy to beyond third place) indicates that for the 50 ppm down to 0.2 ppm Ni reduction, the ratio of (bound DPA molar capacity)/(mols Ni removed) is 1.15.

A bed of the bound DPA might be regenerated with a great excess of $HNO_3$ solution, i.e. 4% $HNO_3$, at an assumed pH of approximately 0.197 to produce a 2,500 ppm Ni solution at a bound DPA loading of 0.0131:

$$\frac{F}{1-F} = \frac{AL8.0 \cdot 2500 \text{ ppm}}{58700 \cdot [1 + (AL2.4 \cdot AL - 0.197) + (AL2.4 \cdot AL6.5 \cdot AL - 0.394)]}$$

$$F = 0.0131$$

Example 1—2,2 Dipicolylamine, also named di-2-picolylamine, also named iminobis (methylene-2-pyridine), abbreviated DPA, was bound to the surface of $SiO_2$ (I: Aerosil 300-5, Degussa; II: Nucleosil 100-5, Macherey-Nagel) in accordance with the teachings of D. Sallin, Diss. No. 929, Uiversity of Fribourg 1987. The modified surface was characterized by elemental analysis, thermogravity and acid-base titration. A surface coverage of $5.3 \times 10^{-4}$ mol DPA/g of I and $5.6 \times 10^{-4}$ mol DPA/g of II was obtained. This corresponds to an identical surface density of one DPA per $10^{-18} m^2$/mol DPA/g for I and II. The binding capacity for $Co^{2+}$, $Ni^{2+}$, $Cu^{2+}$, and $Zn^{2+}$ [Table 1] was determined by the distribution of these ions between surface and solution (pH=4.7, $KNO_3$=0.5 M). The values indicate that not each DPA group can complex a metal ion at the same time. The affinity constant of the surface for H+ was calculated from the titration curve. Each DPA can bind two H+ with the two conditional (0.5 M $KNO_3$) $pK_a$ values of 2.0–2.4 and 5.5–6.5 respectively. These constants are slightly dependent of the degree of protonation, indicating only a small electrostatic interaction between different DPA. The affinity constants for the transition metal ions were deduced from competition equilibria between surface bound DPA and a ligand (NTA for $Co^{2+}$, $Ni^{2+}$, and $Zn^{2+}$; EDTA for $Cu^{2+}$) in solution (pH 4.7, 0.5 M $KNO_3$). They are compared with the conditional complex formation constants of DPA in solution [Table 1]. The absorption equilibria are reversible. The metal ions were completely desorbed by EDTA solution at pH 9. Competition between different metal ions for complexing sites at the surface confirm the order of affinity constants.

TABLE 1

| $M^{2+}$ | Capacity mol/g $SiO_2$ | Surface bound DPA log K (pH 4.7, 0.5M $KNO_3$) | DPA in solution log K (pH 4.7, 0.1M $KNO_3$) |
|---|---|---|---|
| Co | $2.5(3) \times 10^{-4}$ | 5.7 | 5.65 |
| Ni | $2.6(3) \times 10^{-4}$ | 8.0 | 6.90 |
| Cu | $3.1(3) \times 10^{-4}$ | 11.4 | 11.45 |
| Zn | $2.7(3) \times 10^{-4}$ | 5.2 | 5.23 |

Surface coverage is proportional to area. Remarkably, affinity for the metal ions are about the same as for free ligands in solution. Based upon such results, it is believed that the affinity constants for other metals are also comparable to the ones found in the literature, i.e., G. Anderegg et al. (Helv. Chim. Acta, 60 (1977) 123), reporting $Mn^{2+}$, $Fe^{2+}$, $Zn^{2+}$, $Co^{2+}$, $Cu^{2+}$, $Cd^{2+}$, $Pb^{2+}$ and $Ag^+$.

Example 2—In accordance with Example 1, an HPLC column based upon the DPA modified Nucleosil was prepared. The column was found to have capacities similar to the beaker. The relative affinities for the metal ions are also the same. Eluation of the adsorbed metal ions was quantitatively possible with EDTA at pH 9 for $Co^{2+}$, $Cu^{2+}$, and $Zn^{2+}$; $Ni^{2+}$ was slow. Competition experiments between different metal ions in the beaker showed that the strongly bound metal ions can replace more weakly bound ones. The order is $Cu^{2+} \P Ni^{2+} \P Co^{2+} \P Zn^{2+}$. Therefore these systems can be used in ion chromatography.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

I claim:

1. A process for removing a metal ion from solution, comprising:
    chemically binding dipicolylamine to the surface of a silicate and forming a solid phase particle;
    contacting the solution with said solid phase particle and thereby binding a metal ion to the particle.

2. The process according to claim 1, further comprising, after said contacting step, separating the solid phase particle from the solution.

3. The process of claim 1, wherein:
    said solid phase particle is carried in a column; and
    in said contacting step, the solution is passed through said column.

4. The process of claim 1, wherein as part of said contacting step, said solid phase particle is suspended in said solution.

5. The process of claim 1, wherein said solution is aqueous.

6. The process of claim 1, wherein said solution contains organic solvent.

7. The process of claim 1, wherein said metal ion is of cobalt.

8. The process of claim 1, wherein said metal ion is of nickel.

9. The process of claim 1, wherein said metal ion is of copper.

10. The process of claim 1, wherein said metal ion is of zinc.

11. The process of claim 1, further comprising, after said contacting step, removing said metal ion from said particle by exposing the particle and bound metal ion a complexing agent other than dipicolylamine.

12. The process of claim 11, wherein said complexing agent is EDTA.

13. The process of claim 1, further comprising, after said contacting step, removing said metal ion from said particle by exposing the particle and bound metal ion to an acid.

14. The process of claim 13, wherein the bound metal ion and acid are exposed to a solution having pH of less than 4.5.

15. The process of claim 1, wherein said silicate comprises silica gel.

* * * * *